United States Patent
Lou et al.

(10) Patent No.: US 11,386,876 B2
(45) Date of Patent: Jul. 12, 2022

(54) METHOD FOR EXTRACTING BIG BEAT INFORMATION FROM MUSIC BEAT POINTS, STORAGE MEDIUM AND TERMINAL

(71) Applicant: GUANGZHOU BAIGUOYUAN INFORMATION TECHNOLOGY CO., LTD., Guangzhou (CN)

(72) Inventors: Fan Lou, Guangzhou (CN); Jing Li, Guangzhou (CN)

(73) Assignee: BIGO TECHNOLOGY PTE. LTD., Mapletree Business (SG)

( * ) Notice: Subject to any disclaimer, the term of this patent is extended or adjusted under 35 U.S.C. 154(b) by 91 days.

(21) Appl. No.: 16/957,935

(22) PCT Filed: Dec. 4, 2018

(86) PCT No.: PCT/CN2018/119108
§ 371 (c)(1),
(2) Date: Jun. 25, 2020

(87) PCT Pub. No.: WO2019/128638
PCT Pub. Date: Jul. 4, 2019

(65) Prior Publication Data
US 2020/0335074 A1    Oct. 22, 2020

(30) Foreign Application Priority Data
Dec. 28, 2017   (CN) .......................... 201711466076.3

(51) Int. Cl.
*G10H 1/00*   (2006.01)
(52) U.S. Cl.
CPC ..... *G10H 1/0008* (2013.01); *G10H 2210/076* (2013.01)

(58) Field of Classification Search
CPC .................. G10H 1/0008; G10H 2210/076
(Continued)

(56) References Cited

U.S. PATENT DOCUMENTS

| | | | | |
|---|---|---|---|---|
| 5,890,116 A | * | 3/1999 | Itoh ......................... | G10H 1/40 704/503 |
| 7,301,092 B1 | * | 11/2007 | McNally ................ | G10H 1/368 84/612 |

(Continued)

FOREIGN PATENT DOCUMENTS

| CN | 104217729 A | 12/2014 |
|---|---|---|
| CN | 102543052 B | 8/2015 |

(Continued)

OTHER PUBLICATIONS

First office action of Chinese application No. 201711466076.3 dated Apr. 28, 2020.

(Continued)

*Primary Examiner* — Christina M Schreiber
(74) *Attorney, Agent, or Firm* — Dilworth & Barrese, LLP (57) ABSTRACT

A method for extracting big beat information from music beat points includes: acquiring at least one candidate beat cycle according to beat points of music; generating at least one beat point sequence corresponding to the candidate beat cycle and calculating a weight of the beat point sequence, wherein two adjacent beat points in the beat point sequence take the candidate beat cycle as an interval; selecting a beat point sequence with a maximum weight from the at least one beat point sequence of the candidate beat cycle as a maximum weight sequence of the candidate beat cycle; and (Continued)

acquiring the big beat information according to the maximum weight sequence of the at least one candidate beat cycle and the corresponding weight.

20 Claims, 6 Drawing Sheets

(58) Field of Classification Search
USPC .......................................................... 84/602
See application file for complete search history.

(56) References Cited

U.S. PATENT DOCUMENTS

| | | | |
|---|---|---|---|
| 9,293,124 B2 * | 3/2016 | Billen | ................... G10H 1/0008 |
| 2005/0249080 A1 | 11/2005 | Foote et al. | |
| 2009/0287323 A1 * | 11/2009 | Kobayashi | ........... G10H 1/0008 84/453 |
| 2010/0300271 A1 * | 12/2010 | Attias | ...................... G10H 1/40 84/612 |
| 2013/0330062 A1 * | 12/2013 | Meikle | ..................... H04N 9/87 386/285 |
| 2015/0094835 A1 * | 4/2015 | Eronen | ................ G10H 1/0008 700/94 |
| 2020/0327898 A1 * | 10/2020 | Lou | .......................... G10H 1/40 |
| 2020/0335074 A1 * | 10/2020 | Lou | ..................... G10H 1/0008 |

FOREIGN PATENT DOCUMENTS

| | | | | |
|---|---|---|---|---|
| CN | 105513583 A | | 4/2016 | |
| CN | 106652981 A | | 5/2017 | |
| CN | 107229629 A | | 10/2017 | |
| CN | 108108457 A | * | 6/2018 | ........... G06F 16/683 |
| CN | 108108457 A | | 6/2018 | |
| CN | 108335688 A | * | 7/2018 | ............... G10H 1/40 |
| EP | 1978508 A1 | | 10/2008 | |
| EP | 2854128 A1 | * | 4/2015 | ............. G06F 3/165 |
| EP | 2867887 A1 | | 5/2015 | |
| EP | 2867887 B1 | * | 12/2016 | ............... G10H 1/40 |
| KR | 20170106165 A | | 9/2017 | |
| WO | 2014001849 A1 | | 1/2014 | |

OTHER PUBLICATIONS

Notification to grant patent right for invention of Chinese application No. 201711466076.3 dated Sep. 3, 2020.
Extended European search report of counterpart EP application No. 18894999.4 dated Oct. 12, 2020.

* cited by examiner

METHOD FOR EXTRACTING BIG BEAT INFORMATION FROM MUSIC BEAT POINTS, STORAGE MEDIUM AND TERMINAL

CROSS-REFERENCE TO RELATED APPLICATION

The present application is a national phase application based on PCT/CN2018/119108, filed on Dec. 4, 2018, which claims priority to Chinese Patent Application No. 201711466076.3, filed on Dec. 28, 2017 and entitled "METHOD FOR EXTRACTING BIG BEAT INFORMATION FROM MUSIC BEAT POINTS, STORAGE MEDIUM AND TERMINAL", which is incorporated herein by reference in its entirety.

TECHNICAL FIELD

The present disclosure relates to the field of multi-media information technologies, more particularly, relates to a method for extracting big beat information from music beat points, a storage medium and a terminal.

BACKGROUND

Music beat points are general terms of time points with strong rhythms, such as drum set knocking, piano accent, human voice climax and the like in music. However, big beat is a music form developed based on electronic dance music and started in Britain in the mid-1990s. Generally, for a better sense of auditory rhythm of the music, the music producer may add a set of cyclic (or quasi-cyclic) big beat points to music beat points. Taking music with drum kits participating in performance as an example, military drums in the drum kits are commonly used to play the set of beat points, and the big beat points are thereof also referred to as "military drum points". Since the big beat has a better sense of rhythm, it is of great significance in extracting big beat information from the music beat points to be applied to various scenes desired by users. However, no solution is currently available for extracting big beat information in the conventional technology.

SUMMARY

The present disclosure provides a method for extracting big beat information from music beat points. The method includes the following steps:

acquiring at least one candidate beat cycle according to beat points of music;

generating at least one beat point sequence corresponding to the candidate beat cycle and calculating a weight of the beat point sequence, wherein two adjacent beat points in the beat point sequence take the candidate beat cycle as an interval;

selecting a beat point sequence with a maximum weight from the at least one beat point sequence of the candidate beat cycle as a maximum weight sequence of the candidate beat cycle; and acquiring the big beat information according to the maximum weight sequence of the at least one candidate beat cycle and the corresponding weight.

The present disclosure further provides a computer-readable storage medium having at least one computer program stored therein, wherein when the program is executed by a processor, the processor implements:

acquiring at least one candidate beat cycle according to beat points of music;

generating at least one beat point sequence corresponding to the candidate beat cycle and calculating a weight of the beat point sequence, wherein two adjacent beat points in the beat point sequence take the candidate beat cycle as an interval;

selecting a beat point sequence with a maximum weight from the at least one beat point sequence of the candidate beat cycle as a maximum weight sequence of the candidate beat cycle; and acquiring the big beat information according to the maximum weight sequence of the at least one candidate beat cycle and the corresponding weight.

The present disclosure further provides a terminal. The terminal includes:

one or more processors; and a memory configured to store one or more programs;

wherein the one or more programs, when being executed by the one or more processors, enable the one or more processors to perform:

acquiring at least one candidate beat cycle according to beat points of music;

generating at least one beat point sequence corresponding to the candidate beat cycle and calculating a weight of the beat point sequence, wherein two adjacent beat points in the beat point sequence take the candidate beat cycle as an interval;

selecting a beat point sequence with a maximum weight from the at least one beat point sequence of the candidate beat cycle as a maximum weight sequence of the candidate beat cycle; and acquiring the big beat information according to the maximum weight sequence of the at least one candidate beat cycle and the corresponding weight.

Additional aspects and advantages of the present disclosure are described in the following description, and become apparent from the following description or may be understood by practicing the present disclosure.

BRIEF DESCRIPTION OF THE DRAWINGS

The above and/or additional aspects and advantages of the present disclosure may become apparent and easily understood from the following description of the embodiments with reference to the accompanying drawings, in which.

DETAILED DESCRIPTION

Embodiments of the present disclosure are described in detail herein, examples of which are illustrated in the accompanying drawings. The reference numbers which are the same or similar throughout the accompanying drawings represent the same or similar elements or elements with the same or similar functions. The embodiments described below with reference to the accompanying drawings are illustrative for the purpose of explaining the present disclosure only and are not to be construed as limitations to the present disclosure.

Figure 1:
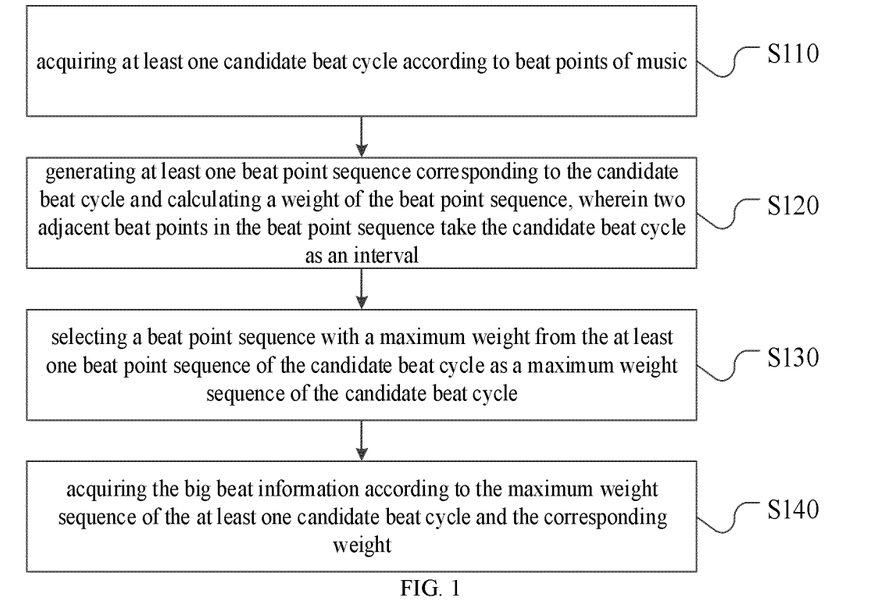
FIG. 1 is a schematic flowchart of a method for extracting big beat information from music beat points according to an embodiment of the present disclosure.

FIG. 1 is a schematic flowchart of a method for extracting big beat information from music beat points according to an embodiment. The method includes the following steps:

S110. At least one candidate beat cycle is acquired according to beat points of music.

The music may be music in a music library, and may also be music uploaded by users themselves. Since the present invention intends to extract big beat information, it is necessary for the music to have performance information with big beat. Taking a military drum as an example, the music needs to be provided with information of snare drum performance. The music beat points are the general terms of time points with strong rhythm characteristics, such as drum set knocking, piano accent, human voice climax, and the like in music. Beat is a unit for measuring rhythm. In music, a series of beats with different strength repeatedly occur at regular intervals. If a group of events or phenomena repeatedly occurs in the same order, the time or spatial interval of completing the group of events or phenomenon is referred to as a cycle.

Firstly, it is necessary to calculate at least one candidate beat cycles from all the beat points for subsequent analysis, wherein acquiring each beat point (no classification at this time) from music data may be performed according to a method in the related art.

S120. At least one beat point sequence corresponding to the candidate beat cycle is generated, and a weight of the beat point sequence is calculated, wherein two adjacent beat points in the beat point sequence take the candidate beat cycle as an interval.

For each candidate beat cycle, at least one beat point sequence is generated. Each beat point sequence includes various beat points, and the two adjacent beat points take the corresponding candidate beat cycle as the interval. The beat points are sequentially arranged according to the time sequence, and the two adjacent beat points refer to two beat points which are arranged in front of and behind each other. The two adjacent beat points taking the corresponding candidate beat cycle as an interval means that the interval between the two adjacent beat points is a positive integer multiple of the corresponding candidate beat cycle, and a certain error, for example, the error of ±5%, is allowed.

For example, one candidate beat cycle is T, and the candidate beat cycle T corresponds to two beat point sequences. One of the two beat point sequences includes {a beat point 1, a beat point 2 and a beat point 3}, wherein the beat point 1 and the beat point 2 are two adjacent beat points, and the interval between the two adjacent beat points is 97% T; and the beat point 2 and the beat point 3 are two adjacent beat points, and the interval between the two adjacent beat points is 102% T. The other one of the two beat point sequences includes {a beat point 4, a beat point 5 and a beat point 6}, wherein the beat point 4 and the beat point 5 are two adjacent beat points, and the interval between the two adjacent beat points is 97%2T; and the beat point 5 and the beat point 6 are two adjacent beat points, and the interval between the two adjacent beat points is 102%3T.

For each candidate beat cycle, at least one beat point sequence corresponding to the candidate beat cycle are acquired, and a weight of each beat point sequence is calculated. The weight of the beat point sequence refers to the relative importance of the beat point sequence in the overall evaluation.

S130. A beat point sequence with a maximum weight is selected from the at least one beat point sequence of the candidate beat cycle as a maximum weight sequence of the candidate beat cycle.

For each candidate beat cycle, the candidate beat cycle includes various beat point sequences, wherein each beat point sequence has a weight, the selected beat point sequence with the maximum weight is the maximum weight sequence of the candidate beat cycle. By analogy, the maximum weight sequence of each candidate beat cycle may be acquired. It can be understood that when one candidate beat cycle only has a beat point sequence, the beat point sequence is the maximum weight sequence of the candidate beat cycle.

S140. Big beat information is acquired according to the maximum weight sequence of the at least one candidate beat cycle and the corresponding weight.

Optionally, the big beat information includes a big beat cycle and a big beat point. The big beat cycle is a total length of notes of each section in a music score. In music, time is divided into equal basic units, and each unit is called a "beat" or "one beat", and a plurality of beats form a section; and real time corresponding to the section is generally fixed and called a big beat cycle. The duration of the section reflects the design on the rhythm of the music by a music score producer. The big beat points are one set of cyclic beat points which are added by a music producer in order to make music have a better sense of auditory rhythm. For music with drum kits participating in performance, military drums in the drum kits are commonly used to play the set of beat points, and the big beat points are thereof also referred to as "military drum points".

After the maximum weight sequence of each candidate beat cycle and the corresponding weight are acquired according to the above steps, the big beat information, such as the big beat cycle and big beat points corresponding to the music, may be calculated from the music beat points according to a certain calculation rule.

According to the embodiment, at least one candidate beat cycle is acquired according to the beat points, and the maximum weight sequence of each candidate beat cycle is acquired, and then the big beat information may be automatically acquired according to the maximum weight sequence and the corresponding weight, thereby realizing the extraction of the big beat information.

Figure 3:
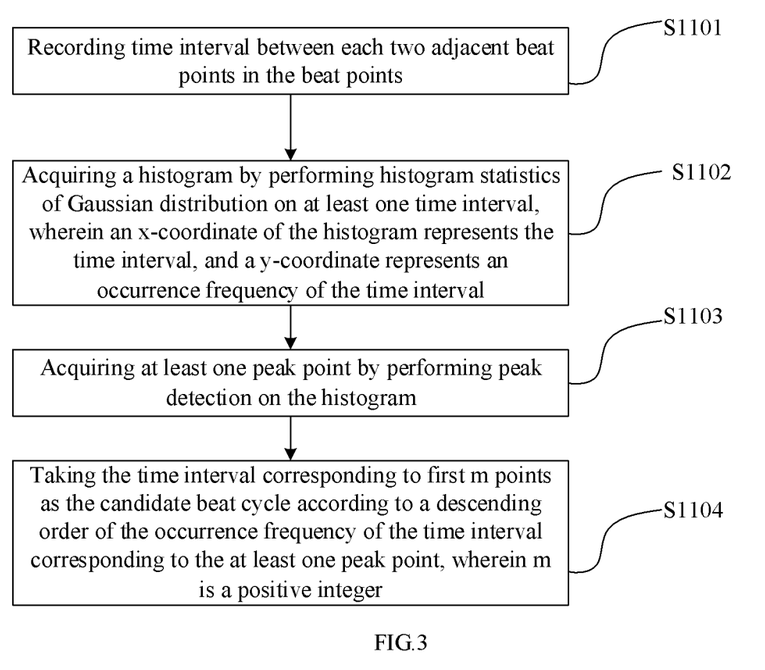
FIG. 3 is a schematic flowchart of a method for acquiring at least one candidate beat cycle according to beat points of music according to an embodiment of the present disclosure.

In one embodiment, as shown in FIG. 3, acquiring the at least one candidate beat cycle according to the beat points of the music includes:

S1101. A time interval between each two adjacent beat points in the beat points is recorded.

Figure 2:
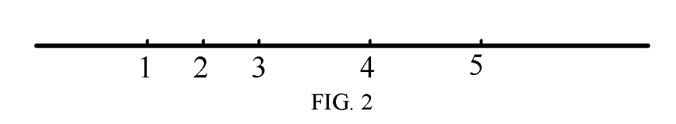
FIG. 2 shows beat points according to an embodiment of the present disclosure.

The time interval between each two input beat points is recorded. Taking the input beat points including a beat point 1, a beat point 2, a beat point 3, a beat point 4, a beat point 5, . . . as an example, and as shown in FIG. 2, the step tends to record the time intervals between the beat point 1 and the beat point 2, between the beat point 2 and the beat point 3, between the beat point 3 and the beat point 4, between the beat point 4 and the beat point 5, and so on. Optionally, the time interval is acquired by subtracting a time of the previous beat point from a time of the next beat point in the two adjacent beat points.

S1102. A histogram is acquired by performing histogram statistics of Gaussian distribution on at least one time interval, where an x-coordinate of the histogram represents the time interval, and a y-coordinate represents an occurrence frequency of the time interval.

Figure 4:
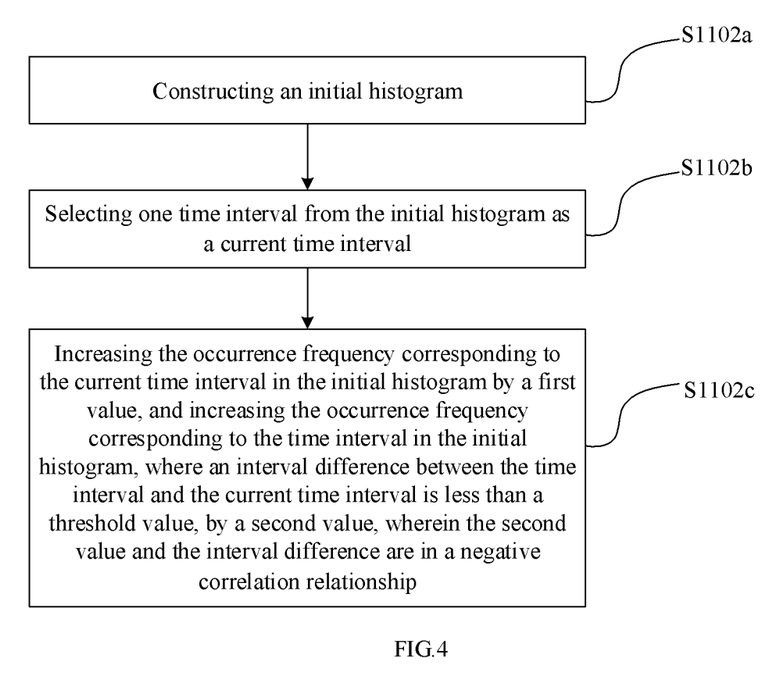
FIG. 4 is a schematic flowchart of a method for performing histogram statistics of Gaussian distribution on at least one time interval according to an embodiment of the present disclosure.

In one embodiment, as shown in FIG. 4, performing histogram statistics of Gaussian distribution on at least one time interval includes:

S1102a. An initial histogram is constructed.

A two-dimensional histogram table is established, wherein an x-coordinate represents all possible time intervals, a y-coordinate represents an occurrence frequency of the time intervals, and all values in the table at initial time are 0.

S1102b. One time interval is selected from the initial histogram as a current time interval.

S1102c. The occurrence frequency corresponding to the current time interval in the initial histogram is increased by a first value, and the occurrence frequency corresponding to the time interval in the initial histogram, where an interval difference between the time interval and the current time interval is less than a threshold value, is increased by a second value, wherein the second value and the interval difference are in a negative correlation relationship.

In some embodiments, the occurrence frequency corresponding to the current time interval T in the initial histogram is increased by the first value N, and the occurrence frequency corresponding to the time interval in the initial histogram, where an interval difference |t−T| between the time interval t and the current time interval T is less than a threshold value δ, is increased by the second value $$n(t) = N \times e^{-\frac{(t-T)^2}{2\sigma^2}},$$

wherein T represents the current time interval, t represents a time interval other than the current time interval, δ represents a threshold value, and e represents a base number of a natural logarithm function.

Furthermore, another time interval is selected from the time intervals as the current time interval, and the step of increasing the value at the position where the current time interval is located in the initial histogram by N and increasing the values at all positions where |t−T|<δ are located in the initial histogram by $$n(t) = N \times e^{-\frac{(t-T)^2}{2\sigma^2}}$$

is repeated, until all the time intervals are selected as the current time interval.

Optionally, one time interval may be selected in order from front to back to the current time interval, until all the time intervals are selected as the current time interval.

By the histogram statistics of Gaussian distribution, influence of the error is eliminated, and the precision of the statistical result is thereof ensured.

S1103. At least one peak point is acquired by performing peak detection on the histogram.

The peak points are acquired by performing peak detection on the histogram according to a set peak detection condition. In one embodiment, the peak detection condition is that a minimum value of data between any two continuous peaks should be less than half of the two peaks. It should be understood that the present disclosure is not limited to detecting the peak points based on the peak detection condition, and users may also adopt other peak detection conditions.

S1104. The time interval corresponding to the first m points is taken as the candidate beat cycle according to a descending order of the occurrence frequency of the time interval corresponding to the at least one peak point, wherein m is a positive integer.

For all the peak points calculated in step S1103, interval times corresponding to m peaks with maximum histogram value (i.e., the maximum occurrence frequency) are selected as a candidate beat cycle.

For each candidate beat cycle, one maximum weight equal-cycle sequence taking the cycle as the interval is extracted from all the beat points, that is the maximum weight sequence. The "equal-cycle" herein is not strictly equivalent, but allows a certain error, such as an error of ±5% and also allows a certain degree of leakage, that is, when the interval between two points in the sequence meets a positive integer multiple of the cycle, the interval is also regarded as an equal interval.

Figure 5:
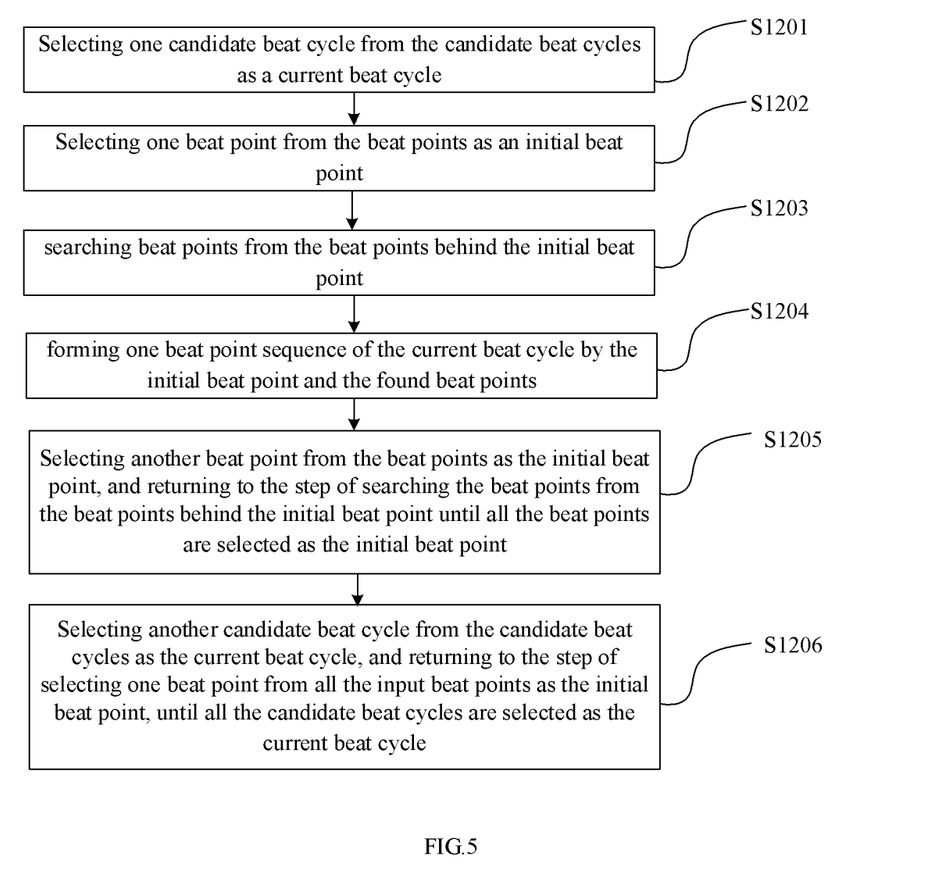
FIG. 5 is a schematic flowchart of a method for generating at least one beat point sequence corresponding to a candidate beat cycle according to an embodiment of the present disclosure.

For extraction of the maximum weight sequence, it is necessary to acquire a plurality of beat point sequences of each candidate beat cycle before the maximum weight sequence is selected from the plurality of beat point sequences. In one embodiment, as shown in FIG. 5, generating at least one beat point sequence corresponding to the candidate beat cycle includes:

S1201. One candidate beat cycle is selected from the candidate beat cycles as a current beat cycle.

Any one of candidate beat cycles is selected as the current beat cycle.

S1202. One beat point is selected from the beat points as an initial beat point.

Any one of beat points is selected as an initial beat point of the current beat cycle. For ease of reading, optionally, each beat point may be selected in order from front to back as the initial beat point.

S1203. Beat points, the interval between which and the initial beat point meets an equal-cycle interval condition, are searched from the beat points behind the initial beat point, wherein the equal-cycle interval condition is that an error between the interval and a positive integer multiple of the current beat cycle is within a set range.

Each input beat point is sequentially arranged according to the time sequence. Beat points meeting the equal-cycle interval condition are searched from front to back by taking the initial beat point as a starting point, and if the beat points are found, the corresponding beat point is recorded. The equal-cycle interval condition is that an error between the interval and a positive integer multiple of the current beat cycle is within in a set range, that is, a certain error is allowed and meanwhile a certain degree of leakage is allowed, that is, when the interval between two points meets a positive integer multiple of the cycle, the two points are regarded as equal interval points.

In a possible implementation, the first beat point meeting the equal-cycle interval condition may be searched from front to back by taking the initial beat point as a starting point, and the beat point is recorded if found. The above process is repeated by taking the previous found beat point as a new starting point until all the beat points taking the initial beat point as the starting point are acquired.

S1204. One beat point sequence of the current beat cycle is formed by the initial beat point and the found beat points.

The initial beat point and all the found beat points form one beat point sequence of the current beat cycle.

S1205. Another beat point is selected from the beat points as the initial beat point, and the step of searching the beat points, an interval between which and the initial beat point meets the equal-cycle interval condition, from the beat points behind the initial beat point is repeated until all the beat points are selected as the initial beat point to acquire all the beat point sequences of the current beat cycle.

An unprocessed beat point is selected as a new initial beat point, optionally, the next beat point of the initial beat point is selected as the new initial beat point and then step S1202 and step S1203 are repeated to acquire another beat point sequence of the current beat cycle. Then the initial beat point is updated and the above step is repeated until all the peat point sequences of the current beat cycle are acquired.

S1206. Another candidate beat cycle is selected from the candidate beat cycles as the current beat cycle, and the step of selecting one beat point from all the input beat points as an initial beat point is repeated until all the candidate beat cycles are selected as the current beat cycle.

After all the beat point sequences of one current beat cycle are acquired, another unprocessed candidate beat cycle is selected as the new current beat cycle, and all beat point sequences of the new current beat cycle are acquired by the above steps. Then the current beat cycle is updated and the above steps is repeated until all the candidate beat cycles are selected and processed. Thus, all the beat point sequences corresponding to all the candidate beat cycles respectively are acquired.

After all the beat point sequences are acquired, it is necessary to calculate a weight of the beat point sequence, so as to compare weights of the beat point sequences acquired by taking each beat point as the starting point, the maximum weight is selected as the weight of the candidate beat cycle and the beat point sequence corresponding to the maximum weight serves as the maximum weight sequence of the candidate beat cycle.

The requirement of weight calculation intends to make real big beat cycles acquire higher weights, and make some cycle values which are easy to generate interference acquire lower weights. The conventional music beats are 2/4 beat, 3/4 beat and 4/4 beat, therefore, the solution of the present disclosure define the values which are easy to generate interference as: 1/2 big beat cycle, 1/3 big beat cycle and two times big beat cycle. The reasons for the definition are based on the following points:

1. For the music of 2/4 beat and 4/4 beat, a beat point may exist at 1/2 position of each section, thereby causing interference of 1/2 big beat cycle.

2. For the music of 3/4 beat, beat points may exist at 1/3 and 2/3 positions of each section, thereby causing interference of 1/3 big beat cycle.

3. For the music of any beats, beat points may exist at positions such as 3/8 section, 5/16 section, or the like, but generally, these beat points will not exist stably for a long time, thus the interference caused by the beat points may be ignored.

4. When music is switched between strong rhythm and weak rhythm, some big beat points may be intentionally omitted, and meanwhile, the accuracy degree of pre-selected beat detection is not 100% and some big beat points may be omitted, thereby causing 2 times big beat cycle interference.

In order to better distinguish real big beat and interference, according to the present disclosure, all the beat points are subjected to strength division by a beat point detection algorithm and are divided into strong beat points and weak beat points, that is, the beat points include strong beat points and weak beat points. In the circulation of beats, the beats include one strong beat and one weak beat during circulation of two units of beats, the beats include one strong beat and two weak beats during circulation of three units of beats, and when there is only one strong tone, the unit beat with the strong tone is called a strong beat and the unit beat without the strong stone is called a weak beat. Based on the following fact: music is played generally with higher strength in order to highlight the rhythm of the music at the big beat points, therefore, the beat point detected as strong is more likely to be big beat point than the beat point detected as weak.

Figure 6:
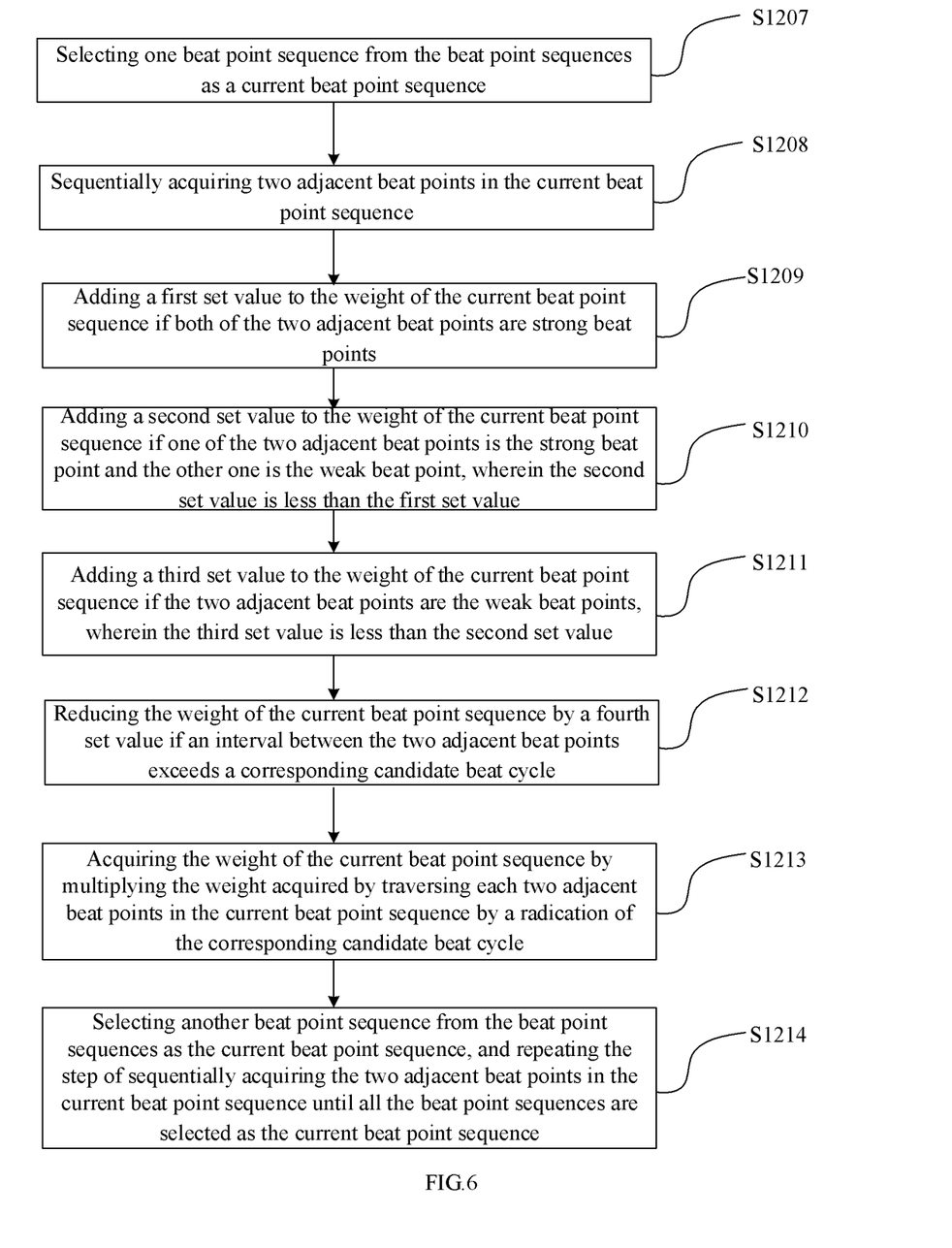
FIG. 6 is a schematic flowchart of a method for calculating a weight of a beat point sequence according to an embodiment of the present disclosure.

Based on the above reasons, in one embodiment as shown in FIG. 6, calculating the weight of the beat point sequence includes:

S1207. One beat point sequence is selected from the beat point sequences as a current beat point sequence.

S1208. Two adjacent beat points in the current beat point sequence are sequentially acquired.

S1209. If both of the two adjacent beat points are strong beat points, a first set value is added to the weight of the current beat point sequence.

In one beat point sequence, the first set value is added to the weight of the beat point sequence if two continuous equal-interval beat points are strong. The first set value may be determined according to actual requirements, for example, the first set value is set as 7.

S1210. If one of the two adjacent beat points is a strong beat point and the other one is a weak beat point, a second set value is added to the weight of the current beat point sequence, wherein the second set value is less than the first set value.

In one beat point sequence, the second set value is added to the weight of the beat point sequence if one of the two continuous equal-interval beat points is strong and the other one is weak. The second set value may be determined according to actual requirements, for example, the second set value is set as 3.

S1211. If the two adjacent beat points are weak beat points, a third set value is added to the weight of the current beat point sequence, wherein the third set value is less than the second set value.

In one beat point sequence, if the two continuous equal-interval beat points are weak, the third set value is added to the weight of the beat point sequence. The third value may be determined according to actual requirements, for example, the third set value is set as 1.

S1212. If an interval between the two adjacent beat points exceeds a corresponding candidate beat cycle, the weight of the current beat point sequence is reduced by a fourth set value.

Optionally, the fourth set value and the interval between the two adjacent beat points are in a positive correlation relationship.

In one beat point sequence, the weight is reduced if the interval between the two continuous beat points exceeds the candidate beat cycle. Optionally, the fourth set value is $2(t-1)^2$, wherein t is the number of interval cycles. It should be understood that the fourth set value according to the present disclosure is not limited to the above determination method.

S1213. The weight of the current beat point sequence is finally acquired by multiplying the weight acquired by traversing each two of adjacent beat points in the current beat point sequence by a radication of the corresponding candidate beat cycle.

The final weight of the beat point sequence may be acquired by multiplying the weight of the beat point sequence acquired by the above steps by a radication of the value of the candidate beat cycle.

S1214. Another beat point sequence is selected from the beat point sequences as the current beat point sequence, and the step of sequentially acquiring the two adjacent beat points in the current beat point sequence is repeated until the beat point sequences are selected as the current beat point sequence.

It should be understood that the present disclosure is not limited to the above weight calculation method, users may simply deform the steps and/or delete or add the steps, which is within the protection scope of the present disclosure as long as not departing from a technical concept that the beat point detected as strong is more likely to be a big beat point than a beat point detected as weak.

In order to better understand the weight calculation method, it will illustrate below with reference to an example.

It is assumed that one beat point sequence is {beat point 1, beat point 2, beat point 3 and beat point 4}, wherein the beat point 1 is a strong beat point, the beat point 2 is a strong beat point, the beat point 3 is a weak beat point and the beat point 4 is a weak beat point, the interval between the beat point 1 and the beat point 2 is 3T, and T is a candidate beat cycle corresponding to the beat point sequence, the weight of the beat point sequence is $(7+3+1-8)*T^{1/2}=3\ T^{1/2}$.

Figure 7:
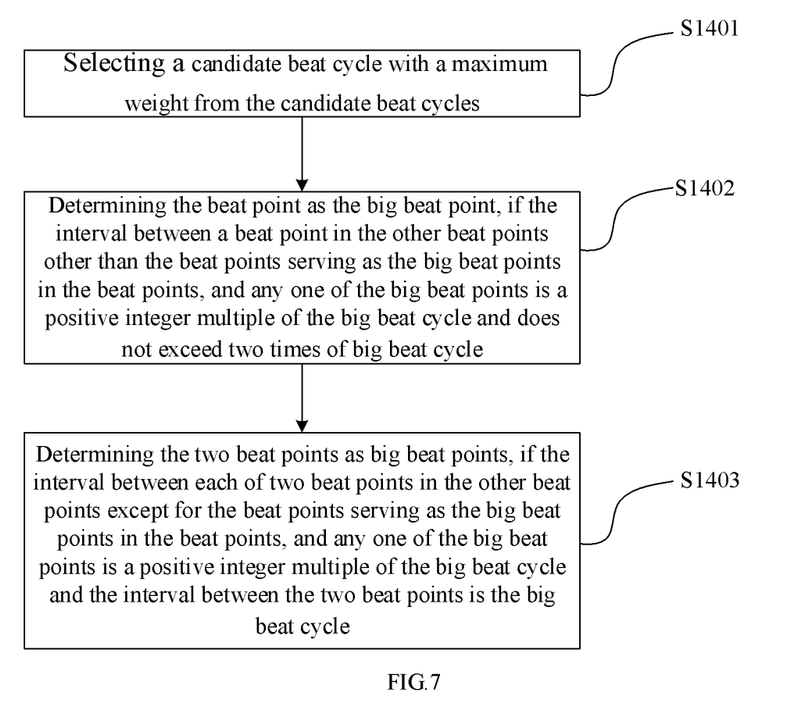
FIG. 7 is a schematic flowchart of a method for acquiring big beat information according to a maximum weight sequence of at least one candidate beat cycle and a corresponding weight.

In one embodiment as shown in FIG. 7, acquiring the big beat information according to the maximum weight sequence of the at least one candidate beat cycle and the corresponding weight includes: S1401. The candidate beat cycle with the maximum weight is selected from the candidate beat cycles, the selected candidate beat cycle serves as a big beat cycle, and the beat points in the maximum weight sequence corresponding to the big beat cycle serves as the big beat points. The candidate beat cycle with the maximum weight in all the candidate beat cycles is output as a big beat cycle, and each beat point in the maximum weight sequence corresponding to the big beat cycle is the big beat point.

It should be understood that the present disclosure is not limited to the above method for determining the big beat information. Within the allowable range of error, the candidate beat cycle with the second largest weight from all the candidate beat cycles may be selected to serve as a big beat cycle, and each beat point in the maximum weight sequence of the selected candidate beat cycle serves as the big beat point.

Due to the introduction of the weight, when the interval between two continuous beat points exceeds 1 cycle, the weight will be reduced. Therefore, some beat points and the selected big beat points may satisfy the equal-beat interval, but the beat points do not belong the maximum weight sequence corresponding to the big beat cycle. The beat points should also be determined as the big beat points when a certain condition is met, therefore, it is necessary to perform supplement operation on the maximum weight sequence corresponding to the big beat cycle, that is, supplement the omissive big beat points.

In one embodiment, after taking the beat points in the maximum weight sequence corresponding to the big beat cycle as the big beat point, the method further includes:

S1402. If the interval between a beat point in the other beat points other than the beat points serving as the big beat points in the beat points, and any one of the big beat points is a positive integer multiple of the big beat cycle and does not exceed two times of big beat cycle, the beat point is determined as the big beat point.

In the embodiment, if the interval between a certain non-big beat point and any one of the big beats is a positive integer multiple of the big beat cycle and does not exceed two times of the big beat cycle, the non-big beat point is determined as the big beat point. Any one of the big beat points refers to a big beat point randomly selected from the maximum weight sequence corresponding to the big beat cycle. The interval is a positive integer multiple of the big beat cycle, and a certain error range is also allowed, that is, the interval only needs to be around the integer multiple of the big beat cycle.

In another embodiment, after taking the beat points in the maximum weight sequence corresponding to the big beat cycle as the big beat points, the method further includes:

S1403. If the interval between each of two beat points, in the other beat points except for the beat points serving as the big beat points in the beat points, and any one of the big beat points is a positive integer multiple of the big beat cycle and the interval between the two beat points is the big beat cycle, the two beat points are determined as big beat points.

When intervals between each of two non-big beat points and any one of the big beat points are a positive integer multiple of the big beat cycle, and the interval between the two non-big beat points is one big beat cycle, the two non-big beat points are determined as big beat points.

The acquired big beat information may be applied to various scenes. It will introduce below with reference to two examples. It should be understood that the big beat information acquired according to the present disclosure is not limited to be applied to the following two scenes, and users also may apply the big beat information to other scenes according to requirements.

For example, preset rhythmic effect is added onto the big beat point indicated by the big beat information. The rhythmic effect refers to the effect related to rhythm, for example, lighting effect, explosion effect, or the like. The big beat information may be directly sent to a video effect module, and the whole video effect is matched with the music rhythm by adding specific rhythmic effect on the big beat points when users record videos.

For another example, the detection result of the beat points of the music is corrected according to the big beat information and the residual beat points are classified and graded, and then preset emotional effect is added onto the residual beat points. The emotional effect refers to effect related to emotion, for example, effect expressing happiness, effect expressing free from worry, or the like. The calculated big beat information may be sent back to a beat detection program to assist the beat detection program in correcting the detection result of the beat points, so as to improve the accuracy degree, wherein the method for correcting the detection result of the beat points according to the big beat cycle in the big beat information may be implemented by an existing method in the prior art. The residual beat points may also be classified and graded according to the big beat information, for example, the beat points other than the big beat points are classified into one category, and the strength grade of this category is less than the strength grade of the big beat point, such that the beat points with different categories and different strengths are applied to different scenes. In addition, the information of the residual beat points may also be directly sent to the video effect module, and the accuracy degree of the video effect and the coordination degree with the music may be improved by adding specific emotional effect on the residual beat points when users record videos.

Figure 8:
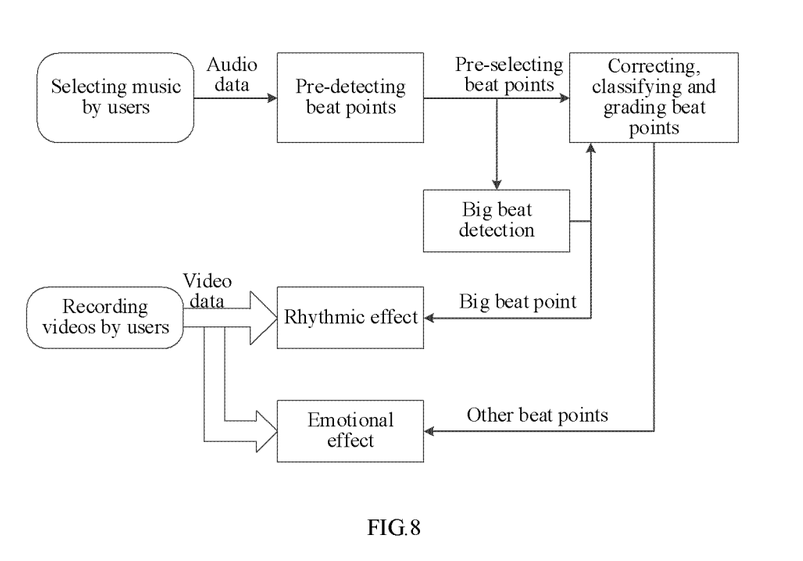
FIG. 8 is a schematic diagram of an application scenario of the big beat information according to an embodiment of the present disclosure.

FIG. 8 is a schematic diagram of an application scenario of big beat information according to an embodiment. When the users select music in the music library or upload one piece of music by themselves, a product application program may calculate one group of preselected beat point information according to audio data of the music and then invoke the scheme of the present disclosure to calculate big beat information corresponding to the music from the preselected beat points, namely the big beat cycle and the big beat point.

The calculated big beat information may be sent back to the beat detection program to assist the beat detection program in correcting the beat detection result to improve the accuracy degree, the residual beat points may be classified and graded, then the residual beat points may be directly sent to the video effect module, and the accuracy degree of the video effect and the coordination degree with the music may be further improved by adding the specific emotional effect onto the residual beat points when the users records the videos.

Further, the calculated big beat information may be directly sent to the video effect module. When the users record the videos, the output effect of the finally video are better matched with the music by adding the specific rhythmic effect onto the big beat points, thereby achieving better viewing experience.

An embodiment of the invention further provides a computer-readable storage medium, in which at least one computer program is stored. The at least one computer program, when being executed by a processor, enables the processor to perform the method for extracting big beat information from music beat points according to any one of above embodiments.

An embodiment of the present disclosure further provides a terminal. The terminal includes:
one or more processors; and
a memory configured to store one or more programs;
wherein the one or more programs, when being executed by the one or more processors, enable the one or more processors perform the method for extracting big beat information from music beat points according to any one of above embodiments. For the specific technical details not disclosed, reference may be made to the method embodiments of the present disclosure. The terminal may be any terminal device including a mobile phone, a tablet computer, a PDA, a point of sales (POS) machine, an onboard computer.

Compared with the related art, the method for extracting the big beat information from music beat points, the storage medium and the terminal have the following advantages:

1. A plurality of candidate beat cycles are acquired according to various input beat points, the maximum weight sequence of each candidate beat cycle is acquired, and the big beat information may be automatically acquired according to the maximum weight sequence and the corresponding weight, thereby realizing extraction of the big beat information.

2. Further, the music beat points are subjected to primary classification, the big beat points which best represent the rhythm of the music are separately extracted, and the output effect of the final video are better matched with the rhythm of the music by adding specific rhythmic effect on the big beat points, such that better viewing experience is acieheved; and moreover, the residual beat points may be better corrected, analyzed and classified with reference to the big beat information, and emotional effect is added on the residual beat points, such that the accuracy degree of the added video effect and the coordination degree with the music is further improved.

3. In addition, histogram statistics is performed by Gaussian distribution, and the precision of the statistic result is guaranteed while influence of the error is eliminated, such that more accurate big beat information is achieved.

4. Furthermore, the weight of each beat point sequence is calculated by the designed weight calculation method, such that the interference of the common 1/2, 1/3 and 2 times big beat cycles is effectively reduced and correct big beat information is acquired.

S. Furthermore, the omissive big beat points are supplemented by a determination condition, such that the extraction accuracy of the big beat points is further improved.

Described above are some embodiments of the present disclosure, and it should be noted that those of ordinary skill in the art may also make several improvements and modifications without departing from the principles of the present disclosure which should be considered as the scope of protection of the present disclosure.

What is claimed is:

1. A method for extracting big beat information from music beat points, comprising:
acquiring at least one candidate beat cycle according to beat points of music;
generating at least one beat point sequence corresponding to the candidate beat cycle and calculating a weight of the beat point sequence according to strength of each two adjacent beat points in the beat point sequence, wherein two adjacent beat points in the beat point sequence take the candidate beat cycle as an interval;
selecting a beat point sequence with a maximum weight from the at least one beat point sequence of the candidate beat cycle as a maximum weight sequence of the candidate beat cycle; and
acquiring the big beat information according to the maximum weight sequence of the at least one candidate beat cycle and the corresponding weight.

2. The method according to claim 1, wherein acquiring the at least one candidate beat cycle according to the beat points of the music comprises:
recording time intervals between each two adjacent beat points in the beat points;
acquiring a histogram by performing histogram statistics of Gaussian distribution on at least one time interval, wherein an x-coordinate of the histogram represents the time interval, and a y-coordinate represents an occurrence frequency of the time interval;
acquiring at least one peak point by performing peak detection on the histogram; and
taking the time interval corresponding to first m points as the candidate beat cycle according to a descending order of the occurrence frequency of the time interval corresponding to the at least one peak point, wherein m is a positive integer.

3. The method according to claim 2, wherein performing the histogram statistics of Gaussian distribution on the at least one time interval comprises:
constructing an initial histogram;
selecting one time interval from the initial histogram as a current time interval;
increasing the occurrence frequency corresponding to the current time interval in the initial histogram by a first value, and increasing the occurrence frequency corresponding to the time interval in the initial histogram, where an interval difference between the time interval and the current time interval is less than a threshold value, by a second value, wherein the second value and the interval difference are in a negative correlation relationship.

4. The method according to claim 3, wherein generating the at least one beat point sequence corresponding to the candidate beat cycle comprises:
selecting one candidate beat cycle from the candidate beat cycles as a current beat cycle;
selecting one beat point from the beat points as an initial beat point;
searching beat points from beat points behind the initial beat point, wherein an interval between the beat points and the initial beat point meets an equal-cycle interval condition, and the equal-cycle interval condition is that an error between the interval and a positive integer multiple of the current beat cycle is within a set range;
forming one beat point sequence of the current beat cycle by the initial beat point and the found beat points;
selecting another beat point from the beat points as the initial beat point, and returning to the step of searching the beat points from the beat points behind the initial beat point until all the beat points are selected as the initial beat point, wherein the interval between the beat points and the initial beat point meets the equal-cycle interval condition; and
selecting another candidate beat cycle from the candidate beat cycles as the current beat cycle, and returning to the step of selecting one beat point from all the input beat points as the initial beat point, until all the candidate beat cycles are selected as the current beat cycle.

5. The method according to claim 3, wherein the big beat information comprises a big beat cycle and big beat points; and
acquiring the big beat information according to the maximum weight sequence of the at least one candidate beat cycle and the corresponding weight comprises:
selecting the candidate beat cycle with the maximum weight from the candidate beat cycles, taking the selected candidate beat cycle as the big beat cycle, and taking the beat points in the maximum weight sequence corresponding to the big beat cycle as the big beat points.

6. The method according to claim 2, wherein acquiring the at least one peak point by performing peak detection on the histogram comprises:
acquiring the at least one peak point by performing the peak detection on the histogram according to a peak detection condition, wherein the peak detection condition is that a minimum value of data between any two continuous peaks is less than half of the continuous peaks.

7. The method according to claim 2, wherein generating the at least one beat point sequence corresponding to the candidate beat cycle comprises:
selecting one candidate beat cycle from the candidate beat cycles as a current beat cycle;
selecting one beat point from the beat points as an initial beat point;
searching beat points from beat points behind the initial beat point, wherein an interval between the beat points and the initial beat point meets an equal-cycle interval condition, and the equal-cycle interval condition is that an error between the interval and a positive integer multiple of the current beat cycle is within a set range;
forming one beat point sequence of the current beat cycle by the initial beat point and the found beat points;
selecting another beat point from the beat points as the initial beat point, and returning to the step of searching the beat points from the beat points behind the initial beat point until all the beat points are selected as the initial beat point, wherein the interval between the beat points and the initial beat point meets the equal-cycle interval condition; and
selecting another candidate beat cycle from the candidate beat cycles as the current beat cycle, and returning to the step of selecting one beat point from all the input beat points as the initial beat point, until all the candidate beat cycles are selected as the current beat cycle.

8. The method according to claim 2, wherein the big beat information comprises a big beat cycle and big beat points; and
acquiring the big beat information according to the maximum weight sequence of the at least one candidate beat cycle and the corresponding weight comprises:
selecting the candidate beat cycle with the maximum weight from the candidate beat cycles, taking the selected candidate beat cycle as the big beat cycle, and taking the beat points in the maximum weight sequence corresponding to the big beat cycle as the big beat points.

9. The method according to claim 1, wherein the beat points comprise strong beat points and weak beat points; and
calculating the weight of the beat point sequence comprises:
selecting one beat point sequence from the beat point sequences as a current beat point sequence;
sequentially acquiring two adjacent beat points in the current beat point sequence;
adding a first set value to the weight of the current beat point sequence if both of the two adjacent beat points are strong beat points;
adding a second set value to the weight of the current beat point sequence if one of the two adjacent beat points is the strong beat point and the other one is the weak beat point, wherein the second set value is less than the first set value;
adding a third set value to the weight of the current beat point sequence if the two adjacent beat points are the weak beat points, wherein the third set value is less than the second set value;
reducing the weight of the current beat point sequence by a fourth set value if an interval between the two adjacent beat points exceeds a corresponding candidate beat cycle;
acquiring the weight of the current beat point sequence by multiplying the weight acquired by traversing each two adjacent beat points in the current beat point sequence by a radication of the corresponding candidate beat cycle; and
selecting another beat point sequence from the beat point sequences as the current beat point sequence, and repeating the step of sequentially acquiring the two adjacent beat points in the current beat point sequence until all the beat point sequences are selected as the current beat point sequence.

10. The method according to claim 9, wherein the fourth set value and the interval are in a positive correlation relationship.

11. The method according to claim 9, wherein generating the at least one beat point sequence corresponding to the candidate beat cycle comprises:

selecting one candidate beat cycle from the candidate beat cycles as a current beat cycle;

selecting one beat point from the beat points as an initial beat point;

searching beat points from beat points behind the initial beat point, wherein an interval between the beat points and the initial beat point meets an equal-cycle interval condition, and the equal-cycle interval condition is that an error between the interval and a positive integer multiple of the current beat cycle is within a set range;

forming one beat point sequence of the current beat cycle by the initial beat point and the found beat points;

selecting another beat point from the beat points as the initial beat point, and returning to the step of searching the beat points from the beat points behind the initial beat point until all the beat points are selected as the initial beat point, wherein the interval between the beat points and the initial beat point meets the equal-cycle interval condition; and selecting another candidate beat cycle from the candidate beat cycles as the current beat cycle, and returning to the step of selecting one beat point from all the input beat points as the initial beat point, until all the candidate beat cycles are selected as the current beat cycle.

12. The method according to claim 9, wherein the big beat information comprises a big beat cycle and big beat points; and acquiring the big beat information according to the maximum weight sequence of the at least one candidate beat cycle and the corresponding weight comprises:

selecting the candidate beat cycle with the maximum weight from the candidate beat cycles, taking the selected candidate beat cycle as the big beat cycle, and taking the beat points in the maximum weight sequence corresponding to the big beat cycle as the big beat points.

13. The method according to claim 1, wherein generating the at least one beat point sequence corresponding to the candidate beat cycle comprises:

selecting one candidate beat cycle from the candidate beat cycles as a current beat cycle;

selecting one beat point from the beat points as an initial beat point;

searching beat points from beat points behind the initial beat point, wherein an interval between the beat points and the initial beat point meets an equal-cycle interval condition, and the equal-cycle interval condition is that an error between the interval and a positive integer multiple of the current beat cycle is within a set range;

forming one beat point sequence of the current beat cycle by the initial beat point and the found beat points;

selecting another beat point from the beat points as the initial beat point, and returning to the step of searching the beat points from the beat points behind the initial beat point until all the beat points are selected as the initial beat point, wherein the interval between the beat points and the initial beat point meets the equal-cycle interval condition; and selecting another candidate beat cycle from the candidate beat cycles as the current beat cycle, and returning to the step of selecting one beat point from all the input beat points as the initial beat point, until all the candidate beat cycles are selected as the current beat cycle.

14. The method according to claim 1, wherein the big beat information comprises a big beat cycle and big beat points; and acquiring the big beat information according to the maximum weight sequence of the at least one candidate beat cycle and the corresponding weight comprises:

selecting the candidate beat cycle with the maximum weight from the candidate beat cycles, taking the selected candidate beat cycle as the big beat cycle, and taking the beat points in the maximum weight sequence corresponding to the big beat cycle as the big beat points.

15. The method according to claim 14, wherein after taking the beat points in the maximum weight sequence corresponding to the big beat cycle as the big beat points, the method further comprises:

if the interval between a beat point in the other beat points other than the beat points serving as the big beat points in the beat points, and any one of the big beat points is a positive integer multiple of the big beat cycle and does not exceed two times of the big beat cycle, determining the beat point as the big beat point.

16. The method according to claim 14, wherein after taking the beat points in the maximum weight sequence corresponding to the big beat cycle as the big beat points, the method further comprises:

if the interval between each of two beat points in the other beat points other than the beat points serving as the big beat points in the beat points, and any one of the big beat points is a positive integer multiple of the big beat cycle and the interval between the two beat points is the big beat cycle, determining the two beat points as the big beat point.

17. A computer-readable storage medium having a computer program stored therein, wherein when the program is executed by a processor, the processor implements:

acquiring at least one candidate beat cycle according to beat points of music;

generating at least one beat point sequence corresponding to the candidate beat cycle and calculating a weight of the beat point sequence according to strength of each two adjacent beat points in the beat point sequence, wherein two adjacent beat points in the beat point sequence take the candidate beat cycle as an interval;

selecting a beat point sequence with a maximum weight from the at least one beat point sequence of the candidate beat cycle as a maximum weight sequence of the candidate beat cycle; and acquiring big beat information according to the maximum weight sequence of the at least one candidate beat cycle and the corresponding weight.

18. A terminal, comprising:

one or more processors;

a memory configured to store one or more programs;

wherein the one or more programs, when being executed by the one or more processors, enable the one or more processors to perform:

acquiring at least one candidate beat cycle according to beat points of music;

generating at least one beat point sequence corresponding to the candidate beat cycle and calculating a weight of the beat point sequence according to strength of each two adjacent beat points in the beat point sequence, wherein two adjacent beat points in the beat point sequence take the candidate beat cycle as an interval;

selecting a beat point sequence with a maximum weight from the at least one beat point sequence of the candidate beat cycle as a maximum weight sequence of the candidate beat cycle; and acquiring big beat information according to the maximum weight sequence of the at least one candidate beat cycle and the corresponding weight.

19. The terminal according to claim 18, wherein acquiring the at least one candidate beat cycle according to the beat points of the music comprises:

recording time intervals between each two adjacent beat points in the beat points;

acquiring a histogram by performing histogram statistics of Gaussian distribution on at least one time interval, wherein an x-coordinate of the histogram represents the time interval, and a y-coordinate represents an occurrence frequency of the time interval;

acquiring at least one peak point by performing peak detection on the histogram; and taking the time interval corresponding to first m points as the candidate beat cycle according to a descending order of the occurrence frequency of the time interval corresponding to the at least one peak point, wherein m is a positive integer.

20. The terminal according to claim 18, wherein the beat points comprise strong beat points and weak beat points; and calculating the weight of the beat point sequence comprises:

selecting one beat point sequence from the beat point sequences as a current beat point sequence;

sequentially acquiring two adjacent beat points in the current beat point sequence;

adding a first set value to the weight of the current beat point sequence if both of the two adjacent beat points are strong beat points;

adding a second set value to the weight of the current beat point sequence if one of the two adjacent beat points is the strong beat point and the other one is the weak beat point, wherein the second set value is less than the first set value;

adding a third set value to the weight of the current beat point sequence if the two adjacent beat points are the weak beat points, wherein the third set value is less than the second set value;

reducing the weight of the current beat point sequence by a fourth set value if an interval between the two adjacent beat points exceeds a corresponding candidate beat cycle;

acquiring the weight of the current beat point sequence by multiplying the weight acquired by traversing each two adjacent beat points in the current beat point sequence by a radication of the corresponding candidate beat cycle; and selecting another beat point sequence from the beat point sequences as the current beat point sequence, and repeating the step of sequentially acquiring the two adjacent beat points in the current beat point sequence until all the beat point sequences are selected as the current beat point sequence.

* * * * *